US012764255B1

(12) United States Patent
White et al.

(10) Patent No.: US 12,764,255 B1
(45) Date of Patent: Oct. 13, 2026

(54) SYSTEMS AND METHODS FOR SIMULATING MEETINGS IN VIRTUAL ENVIRONMENTS

(71) Applicant: United Services Automobile Association (USAA), San Antonio, TX (US)

(72) Inventors: Angelica Nichole White, Fair Oaks Ranch, TX (US); Sean Carl Mitchem, San Antonio, TX (US); Arthur Quentin Smith, Fredericksburg, TX (US); Justin Dax Haslam, San Antonio, TX (US); Robert Wilson Barner, San Antonio, TX (US); Stacy Callaway Huggar, San Antonio, TX (US); Venkateswara Rao Puttagunta, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 57 days.

(21) Appl. No.: 18/679,106

(22) Filed: May 30, 2024

Related U.S. Application Data

(60) Provisional application No. 63/470,067, filed on May 31, 2023.

(51) Int. Cl.
*H04N 7/15* (2006.01)

(52) U.S. Cl.
CPC ............. *H04N 7/157* (2013.01); *H04N 7/152* (2013.01)

(58) Field of Classification Search
CPC ............................... H04N 7/157; H04N 7/152
See application file for complete search history.

(56) References Cited

U.S. PATENT DOCUMENTS

| | | | | |
|---|---|---|---|---|
| 2016/0073059 | A1 * | 3/2016 | Bader-Natal | H04N 7/148 348/14.03 |
| 2022/0256117 | A1 * | 8/2022 | Chikyu | G06Q 10/067 |

* cited by examiner

*Primary Examiner* — Amal S Zenati
(74) *Attorney, Agent, or Firm* — Fletcher Yoder, P.C.

(57) ABSTRACT

A method includes receiving, via at least one processor, meeting information data associated with a plurality of users, the meeting information data comprising a scheduled meeting time. The method also includes identifying a portion of the plurality of users with one or more meetings at the scheduled meeting time based on the meeting information data. The method also includes retrieving user data associated with each user of the portion of the plurality of users from a database. The method also includes determining one or more groups of the portion of the plurality of users based on the user data. The method also includes generating a virtual conference room for each of the one or more groups. The method also includes connecting a user device associated with each user of the one or more groups to the virtual conference room.

20 Claims, 3 Drawing Sheets

SYSTEMS AND METHODS FOR SIMULATING MEETINGS IN VIRTUAL ENVIRONMENTS

CROSS-REFERENCE TO RELATED APPLICATIONS

The present application claims priority to and the benefit of U.S. Provisional Application No. 63/470,067, entitled "SYSTEMS AND METHODS FOR SIMULATING MEETINGS IN VIRTUAL ENVIRONMENTS," filed on May 31, 2023, the disclosure of which is incorporated by reference herein in its entirety for all purposes.

BACKGROUND

The present disclosure relates generally to systems and methods for augmenting image data depicted on an electronic display. More specifically, the present disclosure relates to generating financial information via the augmented image data on the electronic display.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

As more companies introduce the option for remote work, it becomes more difficult to create a sense of culture or cohesiveness with employees that work remotely. That is, from an employee experience perspective, opportunities that allow individuals to interact with each other while working remotely to learn more about each other outside of the remote work environment, strike up random conversations, and the like are limited. As such, a need for systems and methods for facilitating opportunities that help build culture and cohesiveness among employees that work remotely is recognized.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving, via at least one processor, meeting information data associated with a plurality of users, the meeting information data comprising a scheduled meeting time. The method also includes identifying, via the at least one processor, a portion of the plurality of users with one or more meetings at the scheduled meeting time based on the meeting information data. The method also includes retrieving, via the at least one processor, user data associated with each user of the portion of the plurality of users from a database. The method also includes determining, via the at least one processor, one or more groups of the portion of the plurality of users based on the user data. The method also includes generating, via the at least one processor, a virtual conference room for each of the one or more groups. The method also includes connecting, via the at least one processor, a user device associated with each user of the one or more groups to the virtual conference room.

In another embodiment, a system includes one or more client devices. The system also includes a user information database. The system also includes a meeting platform system having one or more processors. The one or more processors are configured to receive meeting information data associated with a plurality of users associated with the one or more meeting client devices, the meeting information data comprising a scheduled meeting time. The one or more processors are also configured to identify a portion of the plurality of users with one or more meetings at the scheduled meeting time based on the meeting information data. The one or more processors are also configured to retrieve user data associated with each user of the portion of the plurality of users from the user information database. The one or more processors are also configured to determine one or more groups of the portion of the plurality of users based on the user data. The one or more processors are also configured to generate a virtual conference room for each of the one or more groups. The one or more processors are also configured to connect the one or more client devices associated with each user of the one or more groups to the virtual conference room.

In another embodiment, a tangible, non-transitory, computer-readable medium, comprising computer-readable instructions that, when executed by one or more processors of an electronic device, cause the electronic device to receive meeting information data associated with a plurality of users associated with the one or more meeting client devices, the meeting information data comprising a scheduled meeting time. The computer-readable instructions also cause the electronic device to identify a portion of the plurality of users with one or more meetings at the scheduled meeting time based on the meeting information data. The computer-readable instructions also cause the electronic device to retrieve user data associated with each user of the portion of the plurality of users from the user information database. The computer-readable instructions also cause the electronic device to determine one or more groups of the portion of the plurality of users based on the user data. The computer-readable instructions also cause the electronic device to generate a corresponding virtual conference room for each of the one or more groups. The computer-readable instructions also cause the electronic device to connect the one or more client devices associated with each user of the one or more groups to the virtual conference room.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
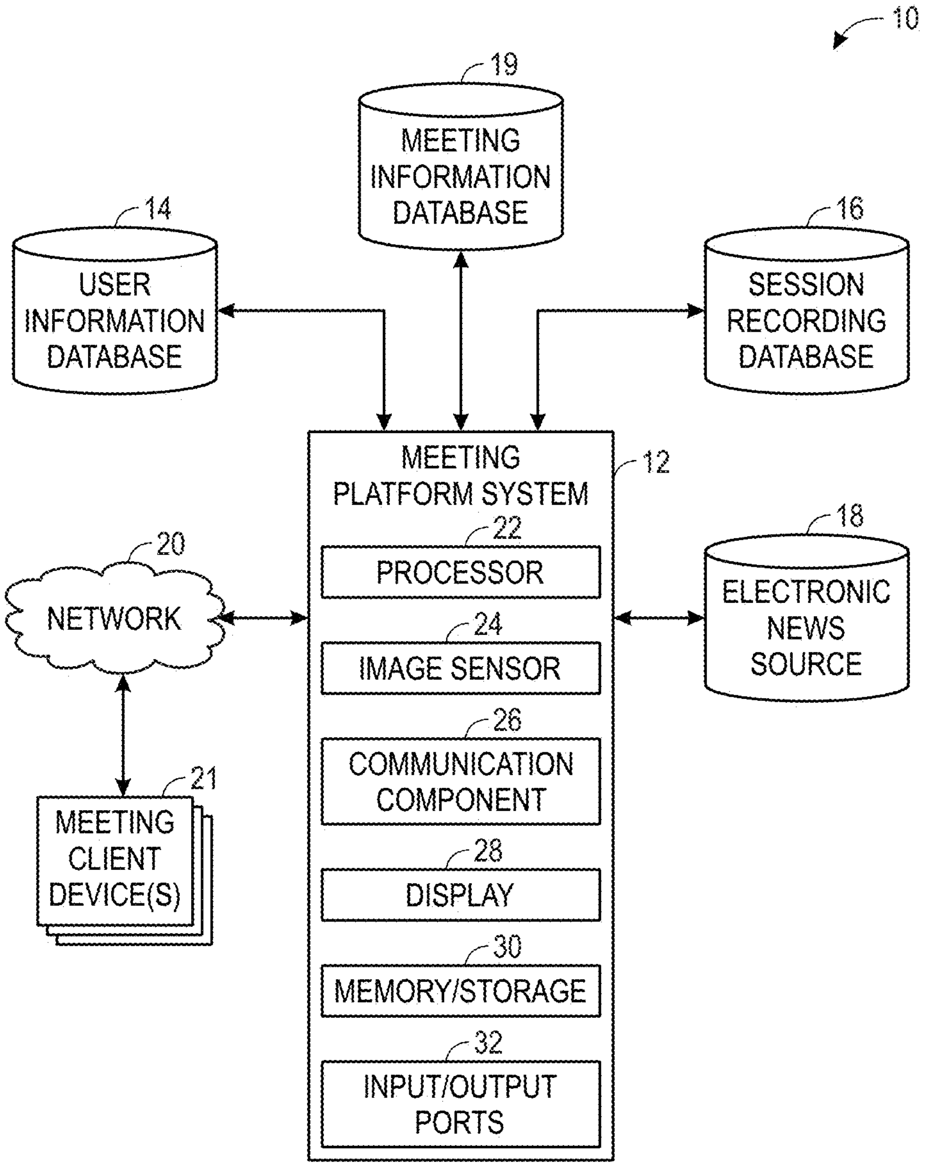
FIG. 1 illustrates a block diagram of a system that includes a meeting platform system communicatively coupled to a number of data sources, in accordance with embodiments described herein.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In the past few years, more companies have switched to hybrid or fully-remote work environments for their employees. While such work environments may provide more flexibility for employees, it some cases it may become more difficult to create a sense of culture or cohesiveness with employees that work remotely. Whereas employees who commute to a common office building may be provided opportunities to interact with other employees at various times throughout the day (e.g., at a water cooler, getting coffee, lunch break, etc.), employees who work remotely may not have these opportunities for interacting with other employees.

It is now recognized that, due to physical separation, there are fewer opportunities for employees who work remotely to socialize with and/or get to know other employees. In accordance with present embodiments, remote employees may be provided an opportunity to socialize with other employees while working remotely via a virtual (e.g., web-based) communication platform, such as a video conferencing platform. By way of example, certain types of communication platforms may be used (e.g., augmented reality platforms) to connect certain employees shortly prior to scheduled meetings. In this way, employees may simulate water cooler moments where employees have the opportunity to socialize with other employees, thereby mimicking employee interaction that may occur at a physical office water cooler or other common area in an office environment that may allow individuals to converse. In this way, employees may be given an opportunity to get to know other employees on a more personal level, thereby allowing enabling employees to form stronger bonds with each other.

Keeping this in mind, to perform the functionalities described above, a meeting platform system (e.g., video conferencing system) may receive data from one or more databases to be used to facilitate the water cooler conference room. The meeting platform system may query a meeting information database for meeting information to identify users (e.g., employees) in a company that may be scheduled for a meeting at a particular time. After retrieving the meeting information, the meeting platform system may query a user information database to identify user information (e.g., employee information) corresponding to the users identified from the meeting information database. In certain embodiments, the user information may include information that a user has voluntarily provided. For example, the user information may include background information or facts about the user that the user has volunteered to share with others (e.g., alma mater, favorite sports team, home town, etc.). In other embodiments, the user information may include other information related to the employee (e.g., search history, department of company, chat log history, etc.). The meeting platform system may then assign users scheduled for an upcoming meeting to a virtual conference room (e.g., virtual conference room, video conferencing room, augmented reality room, etc.) based on the user information, where the users are given an opportunity to interact with other users prior to a scheduled meeting that the identified users may both be attending or not. The meeting platform system may then end the virtual conference room and connect the users to their respective scheduled meetings (e.g., scheduled meeting video conference rooms). Additional details with regard to providing users opportunities to virtually engage with each other while working remotely will be discussed below with reference to FIGS. 1-3 below.

By way of introduction, FIG. 1 is a block diagram of a system 10 that includes a meeting platform system 12, a user information database 14, a session recording database 16, electronic news sources 18, a meeting information database 19, a network 20, meeting client device(s) 21, and the like. Although the meeting platform system 12 is illustrated as being coupled to four databases in FIG. 1, it should be noted that the meeting platform system 12 may be communicatively coupled to a variety of data sources that may assist the meeting platform system 12 in performing the embodiments described herein. The meeting platform system 12 may include various types of components that may assist the meeting platform system 12 in performing various types of computer tasks and operations. For example, the meeting platform system 12 may include a processor 22, one or more image sensors 24, a communication component 26, a display 28, memory/storage 30, an input/output (I/O) port 32, and the like.

The processor 22 may be any type of computer processor or microprocessor capable of executing computer-executable code. The processor 22 may also include multiple processors that may perform the operations described below. The image sensor 24 may be a sensor capable of acquiring image data surrounding the meeting platform system 12. As such, the image sensor 24 may be a camera or other suitable image capturing device (e.g., scanner).

The communication component 26 may be a wireless or wired communication component that may facilitate communication between the meeting platform system 12, databases, and various other computing systems via a network, the Internet, or the like. The display 28 may depict image data acquired by the image sensor 24 and visualizations associated with software or executable code being processed by the processor 22. In one embodiment, the display 28 may be a touch display capable of receiving inputs from a user of the meeting platform system 12. The display 28 may be any suitable type of display, such as a liquid crystal display (LCD), plasma display, or an organic light emitting diode (OLED) display, for example. Additionally, in one embodiment, the display 28 may be provided in conjunction with a touch-sensitive mechanism (e.g., a touch screen) that may function as part of a control interface for the meeting platform system 12.

The memory and the storage 30 may be any suitable articles of manufacture that can serve as media to store processor-executable code, data, or the like. These articles of manufacture may represent computer-readable media (e.g., any suitable form of memory or storage) that may store the processor-executable code used by the processor 22 to perform the presently disclosed techniques. As used herein, applications may include any suitable computer software or program that may be installed onto the meeting platform system 12 and executed by the processor 22. The memory and the storage 30 may represent non-transitory computer-readable media (e.g., any suitable form of memory or storage) that may store the processor-executable code used by the processor 22 to perform various techniques described herein. It should be noted that non-transitory merely indicates that the media is tangible and not a signal. The I/O ports 32 may be interfaces that may couple to other peripheral components such as input devices (e.g., keyboard, mouse), sensors, input/output (I/O) modules, and the like. It should be noted that the components described above with regard to the meeting platform system 12 are exemplary components and the meeting platform system 12 may include additional or fewer components than shown.

In certain embodiments, the meeting platform system 12 may be communicatively coupled to the user information database 14, the session recording database 16, and the meeting information database 19 via the communication component 26. The user information database 14 may include information and/or data pertaining to users of the meeting platform system 12 such as information voluntarily provided by the users. For example, the information voluntarily provided by the users may include background information and/or preferences such as home town, college(s) attended, hobbies, favorite sports team, favorite food, professional interests, company department, and the like. In certain embodiments, the user information database 14 may also include data (e.g., metadata) regarding the users of the meeting platform system 12. For example, the data may include internet browsing history (e.g., browsing data), company chat log history (e.g., company chat log data), amount of time spent talking with other users or certain users, amount of time spent using the meeting platform system 12, and the like.

In certain embodiments, the session recording database 16 may include data and/or preferences related to meetings (e.g., virtual interaction opportunity conference calls) hosted by the meeting platform system 12. In certain embodiments, the session recording database 16 may store recordings of past virtual interaction opportunity conference calls which may be used to augment or improve future virtual interaction opportunity conference calls. In some embodiments, a machine learning algorithm (e.g., neural network, support vector machine, etc.) may be used in conjunction with past recordings (e.g., training data) to improve future virtual interaction opportunity conference calls hosted via the meeting platform system 12. For example, the machine learning algorithm may analyze the past recordings to quantify an amount of socialization and/or positive emotions (e.g., happiness index, cheerfulness index, smiles, laughs, etc.) and, in certain embodiments, analyze past recordings for other characteristics associated with the users (e.g., number of users, age distribution of users, gender distribution of users, company departments of users, etc.). The past recordings may then be used to train (e.g., iteratively train) the machine learning algorithm to determine an assignment of users to different virtual interaction opportunity conference rooms. The process of assigning users to a virtual interaction opportunity conference rooms will be described in more detail in regards to FIG. 2.

In certain embodiments, the session recording database 16 may include information used to characterize past recordings. For example, the session recording database 16 may store the duration of past virtual interaction opportunity conference calls, the start/end times of past virtual interaction opportunity conference calls, and/or selected settings of past virtual interaction opportunity conference calls (e.g., designation of meeting host, required password, availability of chat window, etc.). In other embodiments, the session recording database 16 may store data associated with the content of the past recordings such as current events (e.g., provided by the electronic news sources 18) and/or other external stimuli provided to the meeting to spur discussion (e.g., icebreakers).

In certain embodiments, the electronic news sources 18 may provide the meeting (e.g., via the meeting platform system 12) one or more contemporaneous events to help spur discussion (e.g., socialization) between users. For example, the electronic news sources 18 may search one or more news sources and/or social media websites for event(s) that occurred prior to the virtual interaction opportunity conference call within a given threshold of time. In some embodiments, the electronic news sources 18 may curate (e.g., filter) the events based on one or more factors such as a popularity of the event, a relevancy index (e.g., relevancy to company), and/or a divisiveness index. In certain embodiments, the electronic news sources 18 may be restricted to search for events from a subset of websites (e.g., websites related to the company).

In certain embodiments, the meeting information database 19 may include information and/or data associated with scheduled meetings of each user. For example, the meeting information database 19 may access one or more calendars associated with the employees of a company. Based on the meetings scheduled on the one or more calendars, the meeting information database 19 may generate a dataset of meeting times associated which each company employee, which may be retrieved by the meeting platform system 12. It should be noted that the meeting platform system 12 may iteratively retrieve updated datasets of meeting times from the meeting information database 19 to account for the employees changing meeting times (e.g., adding meetings, canceling meetings, moving meetings, etc.). For example, the meeting platform system 12 may retrieve updated datasets of meeting times at least once every second, at least once every minute, at least once every hour, at least once every day, or at any suitable frequency.

The meeting platform system 12 may be communicatively coupled to the meeting client device(s) 21 via the network 20. In certain embodiments, the meeting client device(s) 21 may include devices with video and audio communication capability (e.g., receiving video/audio, sending video/audio, etc.). For example, meeting client device(s) 21 may include smartphones, laptops, desktop computers, and the like. Additionally or alternatively, meeting client device(s) 21 may include devices that include audio communication capability (e.g., receiving audio, sending audio) such as mobile phones (e.g., flip phones) or landlines. The network 20 may be any network that permits video and/or audio communication (e.g., wireless fidelity network).

Although the user information database 14, the session recording database 16, and the meeting information database 19 are described as separate databases, it should be noted that, in some embodiments, each of these databases may be implemented by one, two, three, or any suitable number of databases. Moreover, it should be noted that the databases may be accessible via the network 20, a direct communication link, or any suitable communication channel.

Referring now to the meeting platform system 12, the meeting platform system 12 may generate the virtual interaction opportunity conference room before or after data is collected from the user information database 14, the session recording database 16, the electronic news sources 18, and/or the meeting information database 19. During the simulated virtual interaction opportunity conference call, the meeting platform system 12 may communicate with meeting client device(s) 21 via the network 20, thereby enabling the users of meeting client device(s) 21 to communicate with each other. In certain embodiments, the meeting platform system 12 may provide video conferencing for all scheduled video meetings imported from the meeting information database 18. In other embodiments, the meeting platform system 12 may operate alongside other video conferencing platform(s). For example, the meeting platform system 12 may provide video conferencing for virtual interaction opportunity conference calls and subsequently transfer users to another video conferencing platform for scheduled conference calls.

Figure 2:
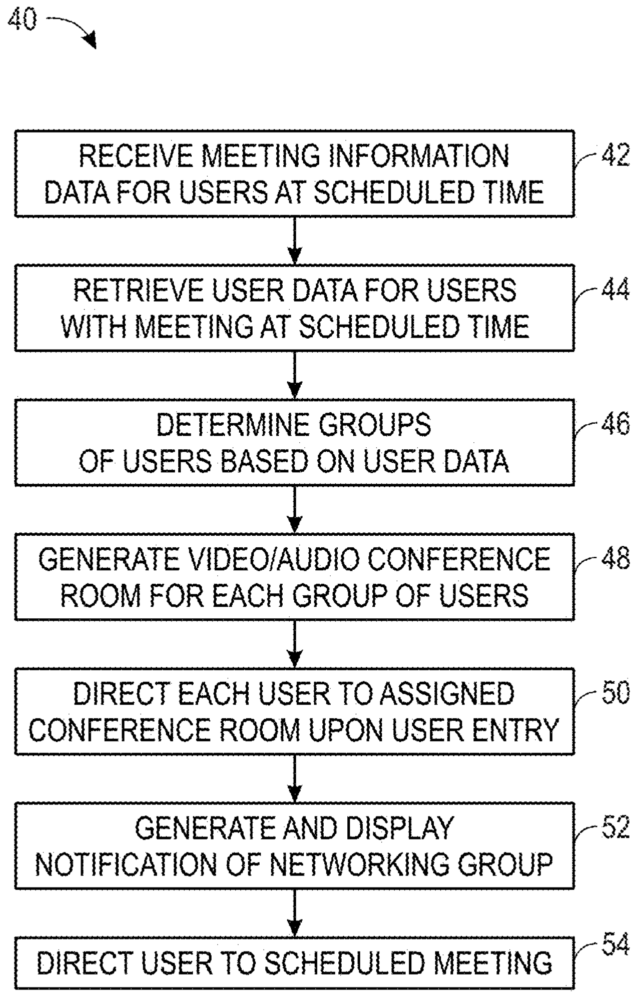
FIG. 2 illustrates a flow chart of a method for implementing a water cooler conference room using the meeting platform system of FIG. 1, in accordance with embodiments described herein.

Keeping the foregoing in mind, FIG. 2 illustrates an example method 40 that may be employed by the processor 22 of the meeting platform system 12. Referring now to FIG. 2, at block 42, the meeting platform system 12 (e.g., processor 22) may receive meeting information data for users at a scheduled time. In certain embodiments, the meeting information may include a dataset (e.g., list, array) of scheduled meeting times for each user in a company or organization. For example, the meeting platform system 12 may receive the scheduled times of meetings (e.g., tentative meetings, confirmed meetings, etc.) scheduled on a calendar of each user. In other embodiments, the meeting platform system 12 may receive scheduled meeting times from the meeting information database 19. Additionally or alternatively, the meeting platform system 12 may receive updated meeting times from the meeting information database 19 (e.g., calendars) at periodic time intervals (e.g., at least once every second, at least once every minute, at least once every hour, etc.).

In certain embodiments, the meeting platform system 12 may receive the times of a subset of scheduled meetings on a calendar of each user. For example, the meeting platform system 12 may receive meeting times that fall on certain increments of time (e.g., every hour, every half hour, every quarter hour, etc.). In other embodiments, the meeting platform system 12 may receive the times of a subset of scheduled meetings not preceded by another scheduled meeting. For example, if a user has scheduled two or more meetings at consecutive time slots, the meeting platform system 12 may receive the first meeting time of the consecutive meeting times, but not receive the second meeting time.

At block 44, the meeting platform system 12 may retrieve user data (e.g., user information) for users with a meeting at a scheduled time. In certain embodiments, the meeting platform system 12 may query the user information database 14 for user information corresponding to users with a meeting at a scheduled time. For example, the meeting platform system 12 may receive a dataset of user information corresponding to the users of each scheduled meeting time and store the dataset of user information in the memory/storage 30. In some embodiments, the meeting platform system 12 may query the user information database 14 for user information corresponding to a particular user in response to said user scheduling a meeting. Additionally or alternatively, the meeting platform system 12 may update the datasets of user information (e.g., via querying the user information database 14) at periodic time intervals (e.g., at least once every second, at least once every minute, at least once every hour, etc.).

In certain embodiments, the meeting platform system 12 may retrieve user data for users having a meeting at a scheduled time based on a threshold number of users with the meeting at the scheduled time. For example, if the number of users having the meeting at the scheduled time falls below the threshold number of users having the meeting at the scheduled time, the meeting platform system 12 may not retrieve user data corresponding to the users and/or may not proceed with the method 40 for scheduling a video/audio conference room prior to the scheduled meeting (e.g., water cooler video/audio conference room).

At block 46, the meeting platform 12 may determine groups of users (e.g., in separate virtual interaction opportunity conference rooms) based on user data (e.g., user information). In certain embodiments, the meeting platform 12 may group users into separate virtual interaction opportunity conference rooms based on a comparison of user information retrieved from the user information database 14 at block 44. For example, the meeting platform 12 may group users based on one or more similarity indices (e.g., similarity scores, similarity measurements). The one or more similarity indices may be an amount of similarity between user information corresponding to a pair of users to be grouped into the virtual interaction opportunity conference rooms. In some embodiments, the one or more similarity indices may be based on different categories (e.g., aspects, groupings) of the user information such as hobbies, experiences, preferences, departments within organization, or the like. For example, the user information may include categories such as hobbies, experiences, preferences, and/or departments within organization, each of which may each have a separate similarity index.

By way of example, the hobbies included in the user information may include activities such as sports, cooking, fitness, watching movies, reading, painting, or other similar activities. The experiences included in the user information may include vacations, life experiences (e.g., switching career paths), accomplishments, places lived, or other similar experiences. The preferences category may include organizational preferences, work environment preferences, personality preferences, food preferences, music preferences, or similar types of preferences. The user information may also include the department(s) within the organization that each user has worked for in the past and/or the department(s) within the organization under which each user currently works.

The measurement of similarity between any two users may be based on a comparison of the corresponding user information of the users found in a dataset (e.g., queried from the user information database 14). The comparison between the corresponding user information of the users may involve a comparison of the user information or, in certain embodiments, a subset of the user information. For example, the meeting platform 12 may form virtual interaction opportunity conference rooms based on users who have similar hobbies, experiences, preferences, departments within the organization, and the like. In this manner, the meeting platform 12 may form groups (e.g., virtual interaction opportunity conference rooms) based on commonalities between corresponding user information, thereby increasing the one or more similarity indices. Similarly, the meeting platform 12 may form virtual interaction opportunity conference rooms based on users who have dissimilar hobbies, experiences, preferences, beliefs, and the like. In this manner, the meeting platform 12 may form groups based on differences between corresponding user information. It should be noted that groups may be formed based on the one or more similarity indices having a value above a first threshold, the one or more similarity indices having a value below a second threshold, or a combination thereof. In other embodiments, the virtual interaction opportunity conference rooms may be formed based on the one or more similarity indices having a high value above the first threshold, the one or more similarity indices having a low value below the second threshold, or a combination thereof.

In certain embodiments, the similarity indices may be determined by incrementing a similarity index corresponding to a particular category based on users selecting common options from a list. For example, the users may be provided with a list of hobbies (e.g., sports, music, painting, cooking, etc.) and may be asked to select a certain number of hobbies from the list. When a pair of users share a common hobby, the corresponding hobby similarity index associated with the pair of users may be incremented. In certain embodiments, the similarity index may be incremented by a certain increment when two hobbies share similar characteristics, even if the two hobbies are not an exact match. For example, the hobby similarity index for the pair of users may increment the hobby similarity index slightly when one user selects "sports" as a hobby and another user selects "outdoor activities" as a hobby. Similarly, the similarity index may be decreased by a certain increment when two hobbies share fewer characteristics. A similar method for determining a similarity index may be used for other categories.

In certain embodiments, the meeting platform system 12 may enable an administrator to customize the one or more similarity indices (e.g., select similarity criteria) used to form the virtual interaction opportunity conference rooms. For example, the meeting platform system 12 may enable the administrator to select hobbies, favorite sports team, and favorite food as the one or more similarity indices used to form the virtual interaction opportunity conference rooms. In certain embodiments, the meeting platform system 12 may enable the administrator to select a target similarity of each similarity index. For example, the meeting platform system 12 may enable the administrator to set a certain target similarity for hobbies (e.g., group members have similar hobbies) and concurrently a different target similarity for favorite food (e.g., group members have different favorite foods). In some embodiments, the meeting platform system 12 may enable the administrator to select a level of similarity for each similarity index from a continuous spectrum of similarity levels (e.g., similarity level ranging from 0 to 100 in increments of 5). In other embodiments, the one or more similarity indices used to form the water cooler conference rooms may be randomly (e.g., pseudo-randomly) selected. In this manner, the meeting platform system 12 may enable the administrator to place even or uneven weight on the one or more similarity indices. Additionally or alternatively, the one or more similarity indices and/or target level of similarity of each similarity index may be decided randomly by the meeting platform system 12.

In certain embodiments, the meeting platform system 12 may form the virtual interaction opportunity conference rooms based on an aggregate similarity index. The aggregate similarity index may be based on the one or more similarity indices of specific categories such as beliefs, preferences, past experiences, and the like. For example, the meeting platform system 12 may determine the aggregate similarity index using an average of the one or more similarity indices. In some embodiments, the meeting platform system 12 may determine the aggregate similarity index using a weighted average of the one or more similarity indices. For example, the meeting platform 12 may give more weight to a similarity index corresponding to personality than to a similarity index corresponding to preferences. Additionally or alternatively, the meeting platform system 12 may enable the administrator to adjust the weighting of the one or more similarity indices.

In certain embodiments, the meeting platform system 12 may form the virtual interaction opportunity conference rooms based on the one or more similarity indices (e.g., or aggregate similarity index) of a subset of users. In other embodiments, the meeting platform system 12 may determine similarity indices based on a weighted average of users. For example, when determining similarity indices, the meeting platform system 12 may place more weight on employee pairs that include at least one new employee. Additionally or alternatively, the meeting platform system 12 may enable the administrator to select specific users (e.g., new employees) and/or adjust the weights associated with each user for determining the similarity indices.

In certain embodiments, the meeting platform 12 may form the virtual interaction opportunity conference rooms based on a relationship between the corresponding user information of the users and external information. For example, the external information may include a news story retrieved from the electronic news sources 18. The meeting platform system 12 may infer how users may react to the news story based on the corresponding user information, and form the virtual interaction opportunity conference rooms based on the inferences. In other embodiments, the external information may include a topic of discussion selected by the administrator. As with the news story, the meeting platform system 12 may infer how users may react to the topic based on the corresponding user information and form the virtual interaction opportunity conference rooms based on the inferences.

In certain embodiments, the meeting platform system 12 may form the virtual interaction opportunity conference rooms using a machine learning algorithm (e.g., neural network, support vector machine, etc.). For example, the machine learning algorithm may use training data (e.g., past recordings of video/audio conference calls) to determine which of the similarity indices and/or other factors will most likely result in a discussion with desired discussion characteristics (e.g., desired discussion outcome). For example, the training data may include one or more discussion characteristics (e.g., positivity, engagement, etc.) of each recording along with the users (e.g., and user information) who participated in the recorded virtual interaction opportunity conference call. In certain embodiments, the machine learning algorithm may be altered or, in certain embodiments, changed to a different algorithm in order to assign users to virtual interaction opportunity conference rooms based on different discussion characteristics (e.g., high positivity and high engagement, low positivity and high engagement, etc.).

In certain embodiments, the meeting platform 12 may form virtual interaction opportunity conference rooms based on other information external to the user information found in the dataset of user information (e.g., received from the user information database 14). In some embodiments, the meeting platform system 12 may form the virtual interaction opportunity conference rooms based on the location of the users. For example, the meeting platform 12 may receive locations of the meeting client device(s) 21 via the network 20 and group the users based on the received locations (e.g., grouping users that are geographically near and/or far from each other). In other embodiments, the meeting platform system 12 may form the virtual interaction opportunity conference rooms based on at the time at which each user scheduled the regular meeting (e.g., following the water cooler conference call). For example, the meeting platform system 12 may place more priority (e.g., weight) on a user who scheduled the regular meeting last week compared to another user who scheduled the regular meeting the previous day.

In certain embodiments, the meeting platform 12 may form virtual interaction opportunity conference rooms by randomly assigning each user to a group. For example, the meeting platform 12 may assign a pseudo-random character to each user and form the virtual interaction opportunity conference rooms based on the pseudo-random characters. In other embodiments, the meeting platform system 12 may use any combination of the above techniques for forming virtual interaction opportunity conference rooms may be used. For example, the meeting platform system 12 may use the one or more similarity indices in combination with the location of the meeting client device(s) 21 for determining the virtual interaction opportunity conference rooms. In another example, the one or more machine learning algorithms may be used to assign group members according to a desired discussion characteristic (e.g., desired discussion outcome), however, the desired discussion characteristics may be randomized between scheduled meetings. It should be understood that the meeting platform system 12 may not be limited to the above techniques when assigning users to water cooler conference rooms.

At block 48, the meeting platform system 12 may generate a video/audio conference room (e.g., virtual interaction opportunity conference room) for each group of users. The video/audio conference room may have similar functionalities as a regular meeting video/audio conference room. For example, the video/audio conference room may provide for capturing video and/or audio via the meeting client device(s) 21 and sharing the video and/or audio with other users in the video/audio conference room. The video/audio conference room may also include other functionalities such as muting audio, direct messaging other users, turning off video capture, and the like. In certain embodiments, the video/audio conference room is generated at a pre-determined time interval before an upcoming scheduled meeting (e.g., retrieved from the meeting information database 19). For example, the video/audio conference room may be generated less than five minutes, ten minutes, thirty minutes before the regular meeting (e.g., scheduled meeting), or at any suitable amount of time prior to the regular meeting. In some embodiments, the predetermined time interval may be adjustable. For example, the administrator may be given privileges to alter the time interval between the time at which the video/audio conference room is generated and the scheduled meeting. An example video/audio conference room will be described in more detail in regards to FIG. 3.

At block 50, the meeting platform system 12 may direct each user to an assigned virtual interaction opportunity conference room (e.g., video/audio conference room) upon user entry. That is, the meeting platform system 12 may present a visualization to a user's device inviting the respective user to join the assigned virtual interaction opportunity conference room, automatically connect the user's device to the assigned virtual interaction opportunity conference room, and the like. In certain embodiments, in response to the user's device accessing (e.g., user entering) the assigned conference room, the meeting platform system 12 automatically displays one or more facts (e.g., from the dataset of user information corresponding to each user) at a location inside the video window corresponding to the user. For example, the meeting platform system may query the dataset of user information for a user and display the user's favorite sports team inside the video window corresponding to the user. The one or more facts displayed inside the video windows corresponding to each user may be the same one or more facts or, in certain embodiments, different one or more facts. For example, the meeting platform system 12 may display each user's favorite sports team such that each user's video window displays the same fact. In another example, the meeting platform system 12 may display a first user's favorite food in a first video window, a second user's favorite sports team in a second video window, and so on.

In certain embodiments, in response to an additional user scheduling a meeting at the scheduled meeting time, the meeting platform system 12 may place the additional user into a particular virtual interaction opportunity conference room based on the one or more similarity indices. For example, the meeting platform system 12 may place the additional user into the particular virtual interaction opportunity conference room based on a decrease or increase in the one or more similarity indices. In some embodiments, the meeting platform system 12 may use the one or more similarity indices to assign the additional user to the particular water cooler conference room without changing the assigned conference rooms of the users who have already been assigned their rooms.

In certain embodiments, the meeting platform system 12 may record the virtual interaction opportunity conference room(s) at a predetermined time after users are directed to the assigned water cooler conference room(s). For example, recording may begin based on a threshold number of users joining the virtual interaction opportunity conference room and/or a predetermined time interval after (e.g., one minute after, 5 minutes after, 10 minutes after) a first user joins the virtual interaction opportunity conference room. In a similar manner, the recording of the video/audio conference may end at a predetermined time interval prior to the scheduled meeting or, in certain embodiments, at the scheduled meeting time. The meeting platform system 12 may then send the recording of the water cooler conference room to the session recording database 16.

In certain embodiments, the meeting platform system 12 may analyze the recordings of the one or more water cooler conference rooms for one or more discussion characteristics based on the discussion between users. For example, the meeting platform system 12 may analyze the recordings for positivity, engagement, group cohesion, and the like. Each of these discussion characteristics may be based on one or more measurable factors from the recording. For example, the meeting platform system 12 may analyze the recording for an amount of positivity based on a detection of a threshold number of certain keywords, an average volume of the recording (e.g., average decibel), and/or a speed at which words are spoken by the users (e.g., number of detected phonemes in a certain length of time). The meeting platform system 12 may then assign a score to each discussion characteristic (e.g., a positivity score), which may be stored along with the recording in the session recording database 16. In certain embodiments, the one or more discussion characteristics may be used for training the machine learning algorithm (e.g., neural network, support vector machine, etc.) which may be used to assist with assigning users to water cooler conference rooms. The machine learning algorithm may be iteratively trained to include newly added recordings at predetermined time intervals. For example, the machine learning algorithm may be retrained based on a set time interval (e.g., once every hour, every day, every week, etc.), based on a count of scheduled meetings (e.g., every other meeting, every tenth meeting, etc.), each time a new recording is added to the session recording database 16, or a combination thereof.

At block 52, the meeting platform system 12 may generate and display a notification of the networking group (e.g., virtual interaction opportunity conference room). In certain embodiments, the notification may appear based on an entry (e.g., or shortly after the entry) of the first user into the virtual interaction opportunity conference room. The notification may remain until the scheduled meeting time (e.g., or until each user leaves), so as to alert additional users who may join the virtual interaction opportunity conference room. For example, the notification may consist of one or more words indicating that the conference room is a virtual interaction opportunity conference room. In some embodiments, the notification is visible to each user and includes a feature that makes it easily noticeable (e.g., bright color, animation, capital letters, etc.).

Additionally, the meeting platform system 12 may display one or more entertainment options to spur discussion between users. For example, the meeting platform system 12 may display one or more current events retrieved from the electronic news sources. In other embodiments, the meeting platform system 12 may include other entertainment options for entertaining the users and/or spurring discussion, such as prompt questions, games (e.g., tic-tac-toe, checkers, etc.), and/or images (e.g., photographs, paintings, etc.). The meeting platform system 12 may also display calendar information which may include the current date, weather, location (e.g. city, state, etc.), and the like.

At block 54, the meeting platform system 12 may direct the users in the virtual interaction opportunity conference room to their scheduled meetings after a certain amount of time has passed, an amount of silent time has been detected, or the like. The meeting platform system 12 may also conduct the schedule meetings or, in certain embodiments, direct the users to another meeting platform that conducts the scheduled meetings. In certain embodiments, the meeting platform system 12 may direct the users to the scheduled meetings at a predetermined time interval (e.g., determined by an administrator) before the start of the scheduled meeting. For example, the meeting platform system 12 may direct the users to the schedule meeting at a time interval ranging from less than a second to more than five minutes before a time of the scheduled meeting. In some embodiments, the meeting platform system 12 may temporarily show a lobby screen (e.g., wait screen) indicating that the user is about to be transferred to the scheduled meeting.

In certain embodiments, the meeting platform system 12 may enable the users to decide to end the virtual interaction opportunity conference room, thereby directing users to their scheduled meetings. For example, the meeting platform system 12 may enable a meeting host (e.g., administrator) to end the virtual interaction opportunity conference room before the time of the scheduled meeting. In other embodiments, the meeting platform system 12 may employ a voting system to enable the users to vote to end the virtual interaction opportunity conference room early in response to one or more users (e.g., a plurality, a majority, etc.) voting to end the virtual interaction opportunity conference room.

In certain embodiments, the meeting platform system 12 may end the virtual interaction opportunity conference room upon the meeting platform system 12 determining that the discussion between the users has breached a threshold characteristic (e.g., sharing of information, agreement, positivity, engagement, etc.). For example, the meeting platform system 12 may measure one or more factors including volume, amount of silence, number of users who have spoken, and the like, to determine when the threshold characteristic has been breached. In certain embodiments, the meeting platform system 12 may use the one or more factors in conjunction with a machine learning algorithm to determine when the threshold characteristic has been breached. In response to the threshold characteristic being breached, the meeting platform system 12 may direct the users to their scheduled meetings.

Figure 3:
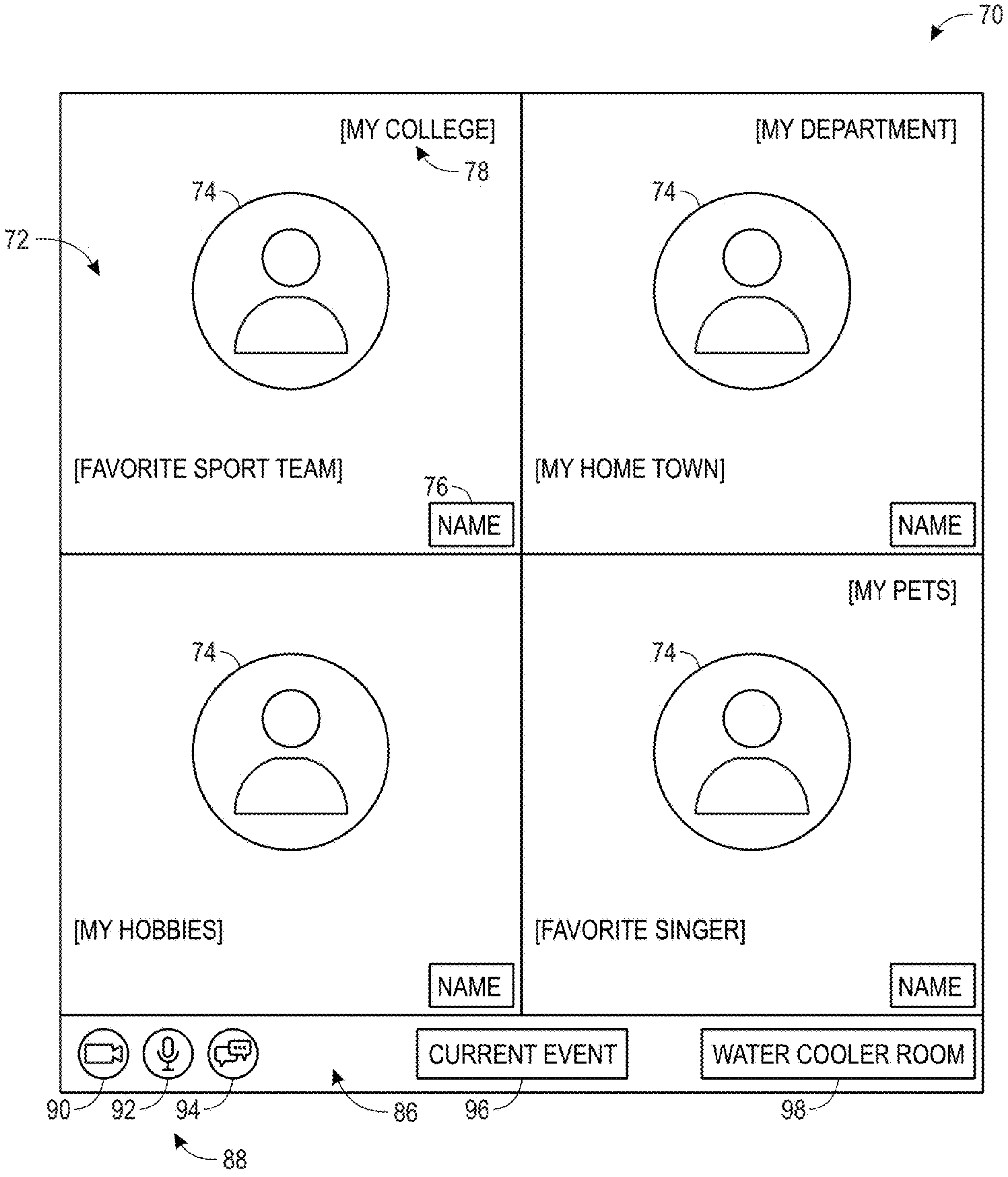
FIG. 3 illustrates an example water cooler conference room using the meeting platform system in FIG. 1, in accordance with embodiments described herein.

With the foregoing in mind, FIG. 3 illustrates an example virtual interaction opportunity conference room 70 using the meeting platform system 12 in FIG. 1. In the illustrated embodiment, the virtual interaction opportunity conference room 70 includes one or more video feeds 72 (e.g., video captures) and audio feeds of one or more users 74. In this manner, each of the one or more users 74 may be able to view the video feeds 72 and listen to the audio feeds of the other users from their own user client device (e.g., mobile device number, etc.). In certain embodiments, a name 76 associated with each of the one or more users 74 is overlaid (e.g., in text) on the one or more video feeds 72. Although the illustrated embodiment shows the names 76 displayed in the lower right corner of the video feeds 72, the names 76 may be displayed at other locations within the video feeds 72.

Each video feed 74 may display one or more background facts 78 (e.g., retrieved from a user information database) associated with the one or more users 74 overlaid (e.g., in text) on the video feeds 72. For example, as shown in the illustrated embodiment, the meeting platform system displays a favorite sports team 80 and a college associated 82 with a user 84 on top of a video feed 86 associated with the user 84. Although the illustrated embodiment shows the one or more background facts 78 varying for each user 74, in certain embodiments the background facts 78 may be the same for each user 74. Furthermore, although the illustrated embodiment shows a maximum of two backgrounds facts 78, it should be understood that one or more background facts 78 may be used for each user 74. In some embodiments, the meeting platform system may display background facts 78 on the video feeds 72 of a subset of the users 74.

In the illustrated embodiment, the virtual interaction opportunity conference room 70 also includes a menu 86, which may appear on the screen of user client device associated with each of the one or more users 74. Although the illustrated embodiment shows the menu 86 as being positioned at the bottom of the virtual interaction opportunity conference room 70, the menu 86 may appear in other locations of the virtual interaction opportunity conference room 70. The menu 86 may include one or more buttons 88 associated with different functionalities. In the illustrated embodiment, the one or more buttons 88 include a video capture on/off button 90, which the users 74 may use to begin and/or end video capture. The illustrated embodiment also shows the buttons 88 including a mute button 92 for muting audio and a direct message button 94 for sending a direct message (e.g., chat message) to another user 74. Although the illustrated embodiment shows the buttons 88 including three buttons, it should be noted that the buttons 88 may include more or fewer buttons that include additional functionalities.

The illustrated embodiment also shows the menu 86 including a current event 96 which may be a recent event retrieved from the electronic news sources. In certain embodiments, the current event 96 may appear at an initiation of the virtual interaction opportunity conference room 70 or, in certain embodiments, at a time interval after the initiation of the water cooler conference room 70. Although the illustrated embodiment shows the current event 96 as being located near a center portion of the menu 86, the current event may be located elsewhere in the water cooler conference room 70.

The illustrated embodiment also shows the menu 86 including a notification 98 providing indication of the virtual interaction opportunity conference room 70 to the users. In the illustrated embodiment, the notification 98 appears on the right side of the menu 86, though it should be noted that the notification 98 may appear at another location in the water cooler conference room 70. The notification 98 may be text or, in certain embodiments, text accompanied by an animation (e.g., moving text, rotating text, etc.).

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:

receiving, via at least one processor, meeting information data associated with a plurality of users, the meeting information data comprising a scheduled meeting time;

identifying, via the at least one processor, a portion of the plurality of users associated with one or more meetings at the scheduled meeting time based on the meeting information data;

retrieving, via the at least one processor, user data associated with each user of the portion of the plurality of users from a database;

determining, via the at least one processor, two or more groups of the portion of the plurality of users based on a similarity between two or more users of the portion of the plurality of users according to the user data;

generating, via the at least one processor, a virtual conference room for each of the two or more groups, wherein the virtual conference room for each of the two or more groups is scheduled to begin at a first time before the scheduled meeting time;

connecting, via the at least one processor, a user device associated with a respective user of each of the two or more groups to a respective virtual conference room; and connecting, via the at least one processor, the portion of the plurality of users to one or more additional virtual conference rooms associated with the one or more meetings at a second time that occurs after the first time, wherein the one or more additional conference virtual rooms are initiated at the scheduled meeting time.

2. The method of claim 1, comprising:

generating, via the at least one processor, a notification associated with the virtual conference room, wherein the notification is configured to be displayed while presenting the virtual conference room.

3. The method of claim 1, wherein the similarity comprises a hobby, an experience, a preference, a company department, or a combination thereof.

4. The method of claim 1, wherein the determining the two or more groups of the portion of the plurality of users is based on comparing an amount of similarity between the two or more users to a threshold similarity value.

5. The method of claim 1, comprising:

displaying, in the virtual conference room, a first graphic comprising at least a first portion of the user data proximate to a first user of the plurality of users, wherein the first portion of the user data is associated with the first user;

displaying, in the virtual conference room, a second graphic comprising at least a second portion of the user data proximate to a second user of the plurality of users, wherein the second portion of the user data is associated with the second user; or both.

6. The method of claim 1, wherein a duration of time between the first time and the scheduled meeting time is adjustable.

7. The method of claim 1, comprising initiating, via the at least one processor, a recording of the virtual conference room in response to a number of users of the portion of the plurality of users that have joined the virtual conference room exceeding a threshold number of users.

8. The method of claim 1, wherein a duration of time spanning from the first time to the scheduled meeting time is greater than five minutes and less than thirty minutes.

9. A system, comprising:

one or more client devices;

a user information database; and a meeting platform system comprising one or more processors configured to:

receive meeting information data associated with a plurality of users associated with the one or more client devices, the meeting information data comprising a scheduled meeting time;

identify a portion of the plurality of users with one or more meetings at the scheduled meeting time based on the meeting information data;

retrieve user data associated with each user of the portion of the plurality of users from the user information database;

determine two or more groups of the portion of the plurality of users based on a similarity between two or more users of the portion of the plurality of users according to the user data;

generate a virtual conference room for each of the two or more groups, wherein the virtual conference room for each of the two or more groups is scheduled to begin at a first time before the scheduled meeting time;

connect a user device of the one or more client devices associated with a respective user of each of the two or more groups to a respective virtual conference room; and connect the portion of the plurality of users to one or more additional virtual conference rooms associated with the one or more meetings at a second time that occurs after the first time, wherein the one or more additional conference virtual rooms are initiated at the scheduled meeting time.

10. The system of claim 9, wherein the similarity comprises a hobby, an experience, a preference, a company department, or a combination thereof.

11. The system of claim 9, wherein the one or more processors are configured to determine the two or more groups based on a difference between the two or more users according to the user data.

12. The system of claim 9, wherein the one or more processors are configured to determine the two or more groups based on comparing an amount of similarity between the two or more users to a threshold similarity value.

13. The system of claim 9, wherein the one or more processors are configured to:

display, in the virtual conference room, a first graphic comprising at least a first portion of the user data proximate to a first user;

display, in the virtual conference room, a second graphic comprising at least a second portion of the user data proximate to a second user of the plurality of users; or both.

14. The system of claim 9, wherein a duration of time between the first time and the scheduled meeting time is adjustable.

15. The system of claim 13, wherein the first portion of the user data is associated with the first user, and the second portion of the user data is associated with the second user.

16. A tangible, non-transitory, computer-readable medium, comprising computer-readable instructions that, when executed by one or more processors of an electronic device, cause the electronic device to:

receive meeting information data associated with a plurality of users associated with one or more client devices, the meeting information data comprising a scheduled meeting time;

identify a portion of the plurality of users with one or more meetings at the scheduled meeting time based on the meeting information data;

retrieve user data associated with each user of the portion of the plurality of users from a user information database;

determine two or more groups of the portion of the plurality of users based on a similarity between two or more users of the portion of the plurality of users according to the user data;

generate virtual conference room for each of the two or more groups, wherein the virtual conference room for each of the two or more groups is scheduled to begin at a first time before the scheduled meeting time;

connect a user device of the one or more client devices associated with a respective user of each of the two or more groups to a respective virtual conference room; and connect the portion of the plurality of users to one or more additional virtual conference rooms associated with the one or more meetings at a second time that occurs after the first time, wherein the one or more additional conference virtual rooms are initiated at the scheduled meeting time.

17. The tangible, non-transitory, computer-readable medium of claim 16, wherein the similarity comprises a hobby, an experience, a preference, a company department, or a combination thereof.

18. The tangible, non-transitory, computer-readable medium of claim 16, wherein the tangible, non-transitory, computer-readable medium causes the electronic device to determine the two or more groups based on a difference between the two or more users according to the user data.

19. The tangible, non-transitory, computer-readable medium of claim 16, wherein the tangible, non-transitory, computer-readable medium causes the electronic device to determine the two or more groups based on comparing an amount of similarity between the two or more users to a threshold similarity value.

20. The tangible, non-transitory, computer-readable medium of claim 16, wherein a duration of time between the first time and the scheduled meeting time is adjustable.

* * * * *